(12) United States Patent
Wang et al.

(10) Patent No.: US 10,577,089 B2
(45) Date of Patent: Mar. 3, 2020

(54) INTEGRATED BIFILAR SYSTEM THAT ABSORBS VIBRATIONS IN BOTH VERTICAL AND IN-PLANE DIRECTIONS

(71) Applicant: Sikorsky Aircraft Corporation, Stratford, CT (US)

(72) Inventors: Z. Kevin Wang, New Haven, CT (US); Larry B. Eastman, Monroe, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 163 days.

(21) Appl. No.: 15/926,318

(22) Filed: Mar. 20, 2018

(65) Prior Publication Data
US 2018/0319485 A1 Nov. 8, 2018

Related U.S. Application Data

(60) Provisional application No. 62/500,628, filed on May 30, 2017.

(51) Int. Cl.
*B64C 27/00* (2006.01)
*F16F 15/14* (2006.01)

(52) U.S. Cl.
CPC .......... *B64C 27/001* (2013.01); *F16F 15/145* (2013.01); *B64C 2027/003* (2013.01); *B64C 2027/005* (2013.01); *F16F 2230/0005* (2013.01)

(58) Field of Classification Search
CPC .................... B64C 2027/003; B64C 2027/005
See application file for complete search history.

(56) References Cited

U.S. PATENT DOCUMENTS

| | | | |
|---|---|---|---|
| 3,372,758 A | 3/1968 | Jenney | |
| 3,540,809 A * | 11/1970 | Mard | B64C 27/001 416/1 |
| 3,932,060 A | 1/1976 | Vincent et al. | |
| 3,988,073 A * | 10/1976 | Eastman | B64C 27/001 416/145 |
| 4,218,187 A | 8/1980 | Madden | |
| 5,495,924 A * | 3/1996 | Shaw | F16F 15/145 188/378 |
| 8,899,928 B2 | 12/2014 | Girard et al. | |

* cited by examiner

*Primary Examiner* — Dwayne J White
*Assistant Examiner* — Jason G Davis
(74) *Attorney, Agent, or Firm* — Cantor Colburn LLP

(57) ABSTRACT

A dual axis bifilar vibration absorber system including a first bifilar vibration absorber having a first support provided with a first cantilevered end including a first opening and a second cantilevered end including a second opening. The first opening is spaced from the second opening along a first axis. A first mass is operatively connected to the first support. A second bifilar vibration absorber is collocated with the first bifilar vibration absorber. The second bifilar vibration absorber includes a support member having a first opening element and a second opening element. The second opening element is spaced from the first opening element along a second axis that is substantially perpendicular to the first axis. A second mass is operatively connected to the support member. The first mass is selectively pivotable about the second axis, and the second mass is selectively pivotable about the first axis.

20 Claims, 3 Drawing Sheets

INTEGRATED BIFILAR SYSTEM THAT ABSORBS VIBRATIONS IN BOTH VERTICAL AND IN-PLANE DIRECTIONS

CROSS-REFERENCE TO RELATED APPLICATIONS

This patent application claims priority to U.S. Provisional Patent Application Ser. No. 62/500,628, filed May 3, 2017, which is incorporated herein by reference in its entirety.

BACKGROUND

Rotary wing aircraft generally includes a rotor hub that supports rotor blades as well as various rotor blade control elements. The rotor blades, rotor blade control elements, and other structure which, when rotated, cause vibration. Currently, many rotor hubs are provided with bifilar vibration absorbers. A bifilar vibration absorber includes a support and one or more sets of bifilar masses each including a dynamic mass and two tuning pins. The tuning pins radially constrain the dynamic mass. The dynamic mass is free to move relative to the rotor hub. The support is fixedly attached to the rotor hub.

During operation, the dynamic mass, acting as a pendulum, moves in a pendulous movement relative to the support. When the natural frequency of the mass is equal to a rotor excitation frequency, vibrations are either reduced or eliminated. Currently, the bifilar vibration absorber is positioned to reduce and/or eliminate vibrations in a plane defined by rotor blade rotation. That is, rotation of the mass in a plane of the rotor blade rotation develops an opposing force that reduces rotor excitations that may exist in the plane of rotor blade rotation. Vibrations may still exist along a plane that is substantially normal to the plane of rotor blade rotation.

BRIEF DESCRIPTION

Disclosed is a dual axis bifilar vibration absorber system including a first bifilar vibration absorber having a first support provided with a first cantilevered end including a first opening and a second cantilevered end including a second opening. The first opening is spaced from the second opening along a first axis. A first mass is operatively connected to the first support. The first mass includes a first end having a first opening section, a second end including a second opening section, and an intermediate portion extending therebetween. A second bifilar vibration absorber is collocated with the first bifilar vibration absorber. The second bifilar vibration absorber includes a support member having a first opening element and a second opening element. The second opening element is spaced from the first opening element along a second axis that is substantially perpendicular to the first axis. A second mass is operatively connected to the support member. The second mass includes a first end section having a first opening portion, and a second end section having a second opening portion. The first mass is selectively pivotable about the second axis in order to attenuate vibration in the first axis, and the second mass is selectively pivotable about the first axis to attenuate vibration in the second axis.

In addition to one or more of the features described above or below, or as an alternative, further embodiments could include wherein the second bifilar vibration absorber is arranged between the first opening and the second opening.

In addition to one or more of the features described above or below, or as an alternative, further embodiments could include wherein the second mass is arranged radially inwardly of the first mass.

In addition to one or more of the features described above or below, or as an alternative, further embodiments could include wherein the first support includes a first mounting end connectable to a rotor hub and a second mounting end connectable to the rotor hub, the support member being connectable to the rotor hub between the first and second mounting ends.

In addition to one or more of the features described above or below, or as an alternative, further embodiments could include a second support spaced from the first support along the second axis, the second support including a third cantilevered end including a third opening and a fourth cantilevered end including a fourth opening, the third opening being spaced from the fourth opening along the first axis, the first mass being arranged between the third cantilevered end and the fourth cantilevered end.

In addition to one or more of the features described above or below, or as an alternative, further embodiments could include a first tuning pin extending from the first opening to the third opening through the first opening section, and a second tuning pin extending from the second opening to the fourth opening through the second opening section.

In addition to one or more of the features described above or below, or as an alternative, further embodiments could include wherein the second mass includes a first member having the first and second opening portions, and a second member having a third opening portion and a fourth opening portion, wherein the second opening portion is spaced from the first opening portion along the second axis and the fourth opening portion is spaced from the third opening portion along the second axis, the support member being arranged between the first and second members.

In addition to one or more of the features described above or below, or as an alternative, further embodiments could include a first tuning pin member extending from the first opening portion to the third opening portion through the first opening element, and a second tuning pin member extending from the second opening portion to the fourth opening portion through the second opening element.

Also disclosed is a rotary wing aircraft including a fuselage, a prime mover supported by the fuselage, a rotor assembly including a rotor hub and a plurality of rotor blades operatively connected to the prime mover, and a dual axis bifilar vibration absorber system mounted to the rotor hub. The dual axis bifilar vibration absorber system includes a first bifilar vibration absorber having a first support mounted to the rotor hub. The first support is provided with a first cantilevered end including a first opening and a second cantilevered end including a second opening. The first opening is spaced from the second opening along a first axis. A first mass is operatively connected to the first support. The first mass includes a first end having a first opening section, a second end including a second opening section, and an intermediate portion extending therebetween. A second bifilar vibration absorber collocated with the first bifilar vibration absorber, the second bifilar vibration absorber includes a support member having a first opening element and a second opening element. The second opening element is spaced from the first opening element along a second axis that is substantially perpendicular to the first axis. A second mass is operatively connected to the support member. The second mass includes a first end section having a first opening portion and a second end section having a second opening portion. The first mass is selectively pivotable about the second axis in order to attenuate vibration in the first axis, and the second mass is selectively pivotable about the first axis to attenuate vibration in the second axis.

In addition to one or more of the features described above or below, or as an alternative, further embodiments could include wherein the second bifilar vibration absorber is arranged between the first opening and the second opening.

In addition to one or more of the features described above or below, or as an alternative, further embodiments could include wherein the second mass is arranged radially inwardly of the first mass.

In addition to one or more of the features described above or below, or as an alternative, further embodiments could include wherein the second mass includes a first member having the first and second opening portions, and a second member having a third opening portion and a fourth opening portion, wherein the second opening portion is spaced from the first opening portion along the second axis and the fourth opening portion is spaced from the third opening portion along the second axis, the support member being arranged between the first and second members.

In addition to one or more of the features described above or below, or as an alternative, further embodiments could include a first tuning pin member extending from the first opening portion to the third opening portion through the first opening element, and a second tuning pin member extending from the second opening portion to the fourth opening portion through the second opening element.

In addition to one or more of the features described above or below, or as an alternative, further embodiments could include wherein the rotor assembly comprises a main rotor assembly.

In addition to one or more of the features described above or below, or as an alternative, further embodiments could include wherein the first mass surrounds a portion of the second mass.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
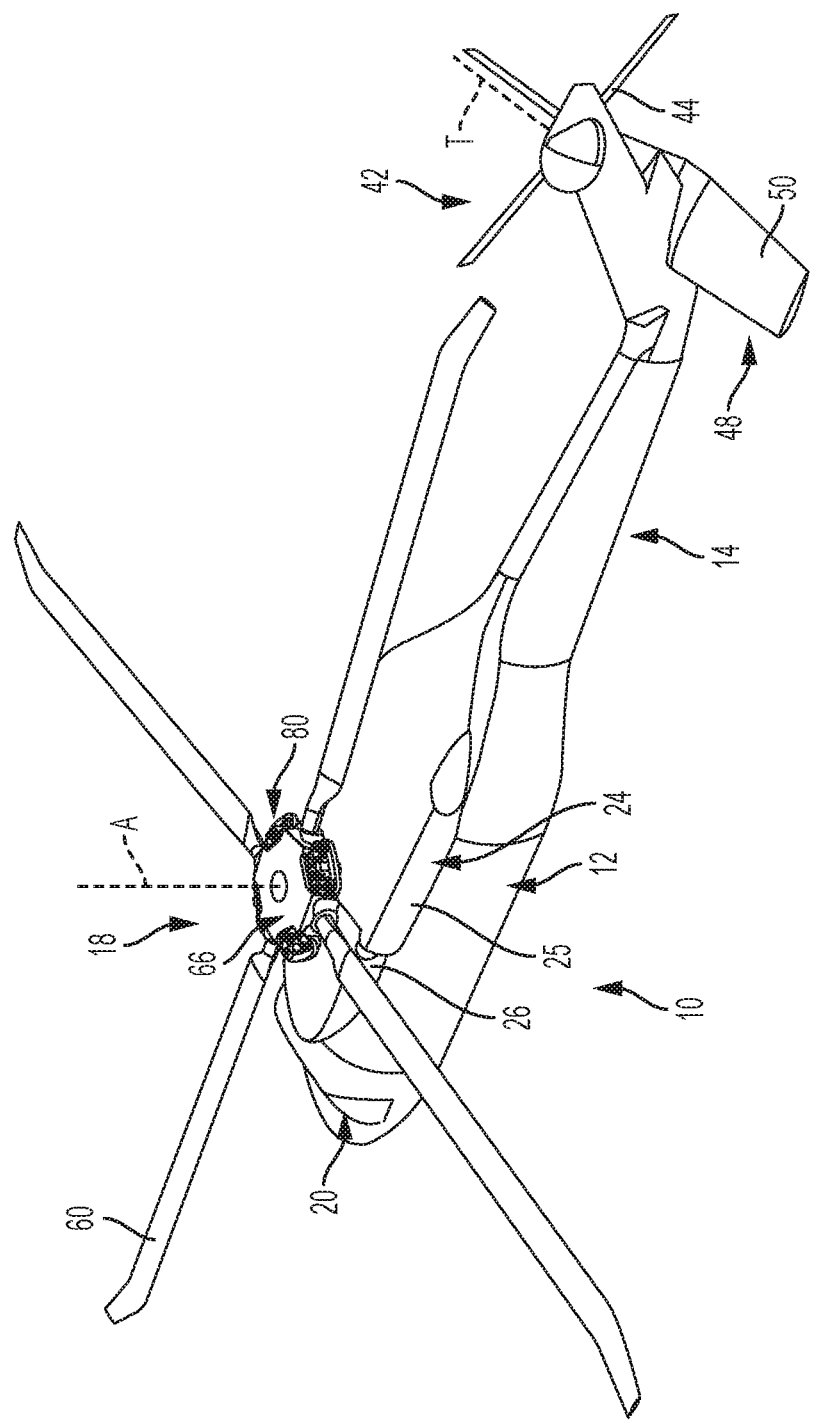
FIG. 1 depicts a rotary wing aircraft including a dual axis bifilar vibration absorber system, in accordance with an aspect of an exemplary embodiment.

FIG. 1 depicts an exemplary embodiment of a rotary wing, vertical takeoff and landing (VTOL) aircraft 10. Aircraft 10 includes an airframe or fuselage 12 having a plurality of surfaces (not separately labeled), and an extending tail 14. A main rotor assembly 18 is located above fuselage 12 and rotates about a main rotor axis "A". While shown with a single rotor assembly, it is to be understood that aircraft 10 may include multiple rotors. In an exemplary embodiment, fuselage 12 includes a cockpit 20 having two seats for flight crew (e.g., pilot and co-pilot) (not shown). Main rotor assembly 18 is driven by a prime mover 24, for example, one or more engines 25, via a gearbox 26. It is to be understood that prime mover 24 may take on various forms. Main rotor assembly 18 may be operatively coupled to gearbox 26 through at least one main rotor shaft (also not shown).

Extending tail 14 supports a tail rotor assembly 42 that may be connected to, and driven by, prime mover 24 via gearbox 26. Tail rotor assembly 42 includes tail rotor hub (not shown) that supports a plurality of tail rotor blades, one of which is indicated at 44, that may be driven about a tail rotor axis "T" by prime mover 24. Extending tail 14 may also include a stabilizer 48 including an aerodynamic surface 50 which enhances flight characteristics of aircraft 10. Main rotor assembly 18 includes a plurality of rotor blades, one of which is indicated at 60, supported by a rotor hub 66. Rotor blades 60 may be connected to rotor hub 66 in a hingeless or articulated manner. At this point, it is to be understood that the exemplary embodiment may be integrated into a wide range of rotary wing aircraft and are not limited to the particular aircraft shown. For instance, the tail rotor axis T could be rotated to be substantially parallel with the aircraft body such that the tail rotor assembly would be in a propulsor configuration to create thrust.

Figure 2:
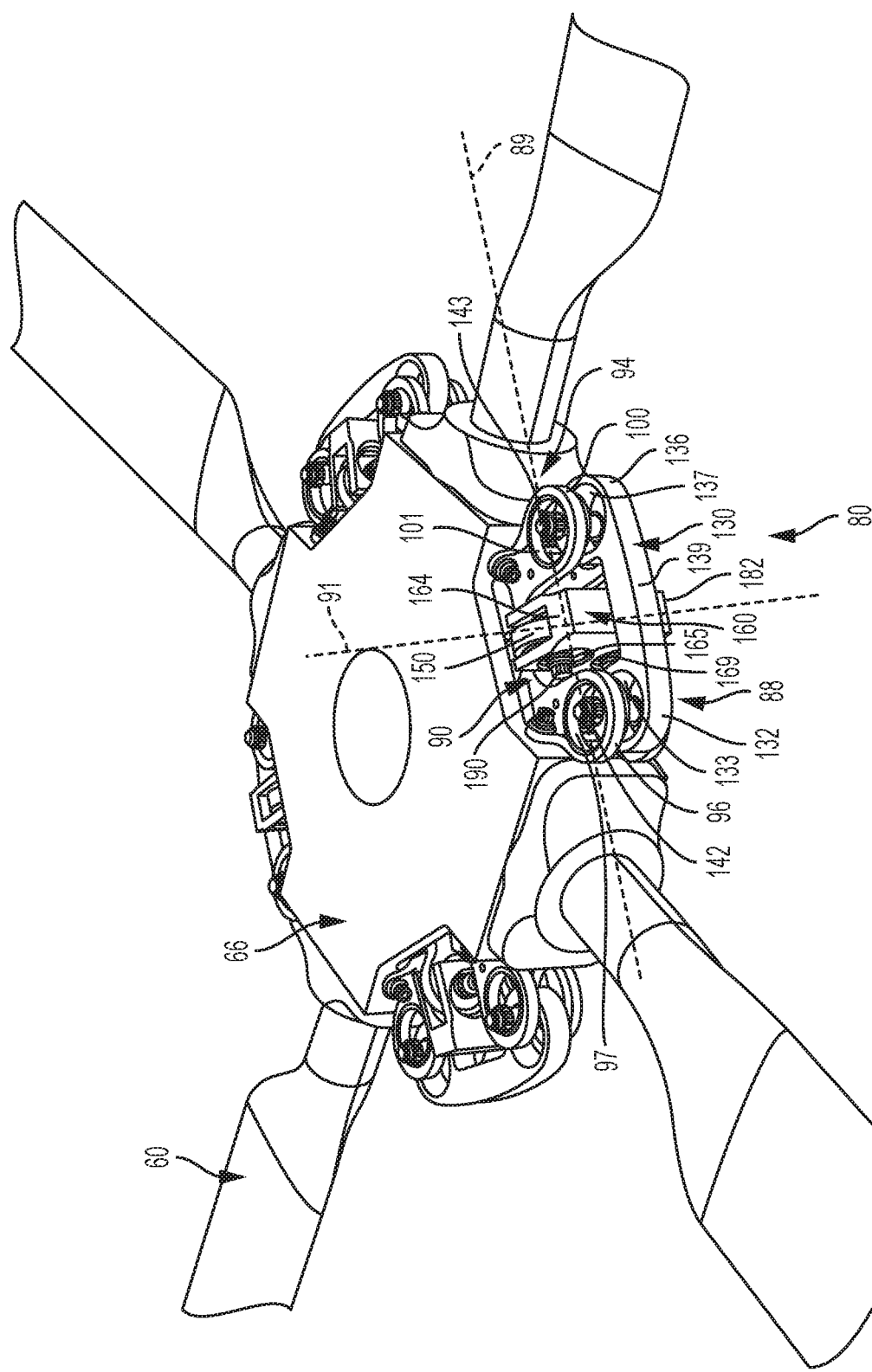
FIG. 2 depicts a rotor hub assembly of the rotary wing aircraft of FIG. 1 illustrating the dual axis bifilar vibration absorber system, in accordance with an aspect of an exemplary embodiment.
Figure 3:
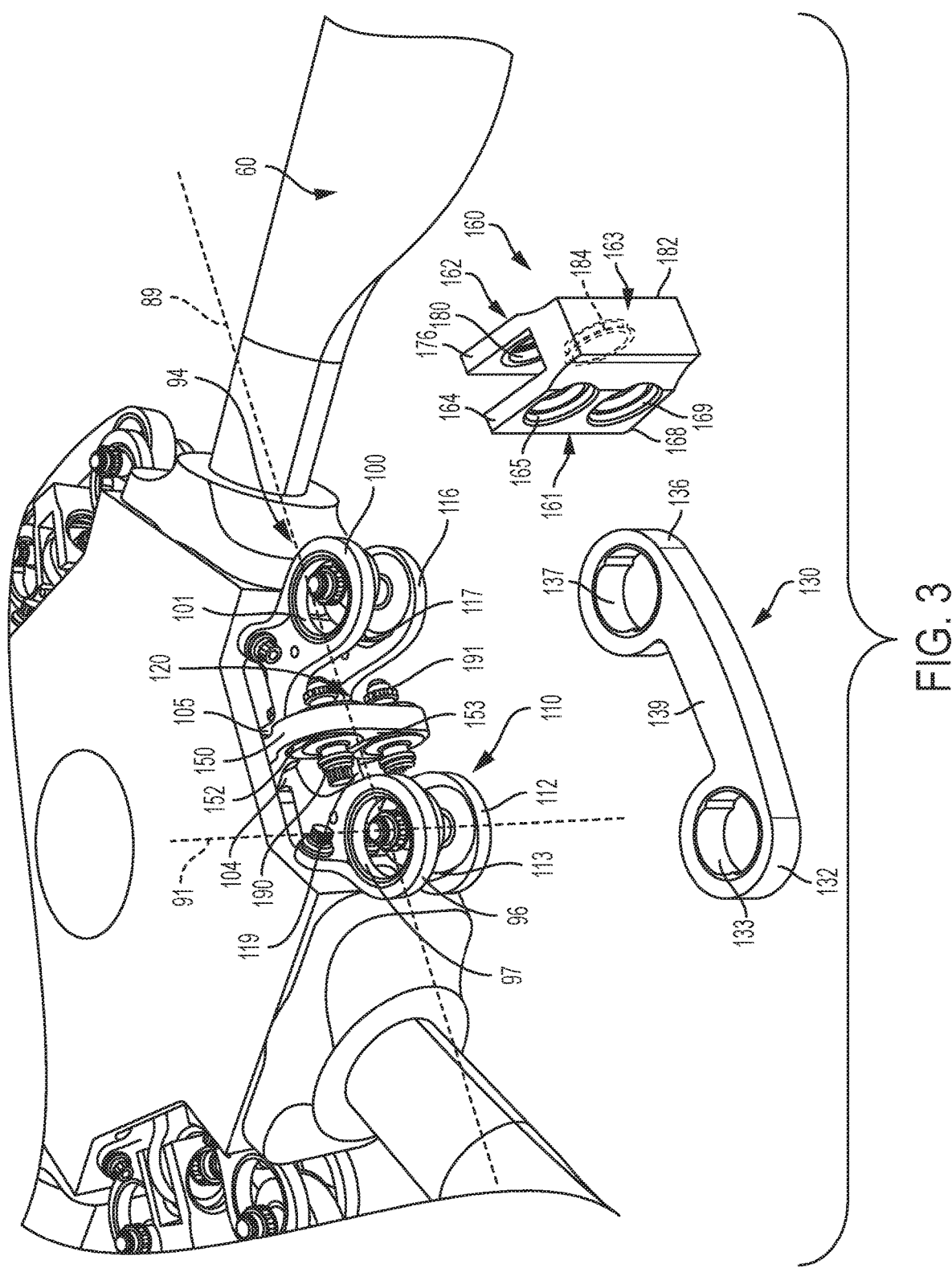
FIG. 3 depicts a partially disassembled view of the dual axis bifilar vibration absorber system, in accordance with an aspect of an exemplary embodiment.

In accordance with an aspect of an exemplary embodiment, aircraft 10 includes a dual axis bifilar vibration absorber system 80 mounted to rotor hub 66 between adjacent ones of rotor blades 60. As shown in FIGS. 2-3, each dual axis bifilar vibration absorber system 80 includes a first bifilar vibration absorber 88 mounted to attenuate vibrations along a first axis 89 and a second bifilar vibration absorber 90 mounted to attenuate vibrations along a second axis 91. The second axis 91 may be substantially perpendicular to the first axis 89. In accordance with an aspect of the exemplary embodiment, first bifilar vibration absorber 88 and second bifilar vibration absorber 90 are collocated on hub 66 in a space (not separately labeled) between adjacent pairs of blades 60. Further, dual axis bifilar vibration absorber system 80 is substantially coplanar with the blades 60 and does not extend beyond an upper surface of rotor hub 66. By collocating the first bifilar vibration absorber 88 and second bifilar vibration absorber 90 between adjacent ones of rotor blades 60 dual axis bifilar vibration absorber system 80 establishes a low profile that effects on aerodynamic drag of VTOL aircraft 10.

In accordance with an exemplary aspect, first bifilar vibration absorber 88 includes a first support 94 having a first cantilevered end 96 provided with a first opening 97 and a second cantilevered end 100 including a second opening 101. First opening 97 is spaced from second opening 101 along first axis 89. First support 94 also includes a first mounting end 104 and a second mounting end 105. First and second mounting ends 104 and 105 connect first support 94 with rotor hub 66. First bifilar vibration absorber 88 also includes a second support 110 having a third cantilevered end 112 provided with a third opening 113 and a fourth cantilevered end 116 provided with a fourth opening 117. Third opening 113 is spaced from fourth opening 117 along first axis 89. Additionally, third opening 113 aligns with first opening 97 and fourth opening 117 aligns with second opening 101.

In addition, first support 94 is spaced from second support 110 along second axis 91 which may be substantially parallel to main rotor axis "A". Second support 110 is also shown to include a third mounting end 119 and a fourth mounting end 120. Third and fourth mounting ends 119 and 120 connect second support 110 to rotor hub 66. It is to be understood that first, second, third, and fourth mounting end 104, 105, 119, and 120 may be separated from one another or connected as a single mounting surface.

In further accordance with an exemplary aspect, first bifilar vibration absorber 88 includes a first mass 130 operatively connected with and moveably mounted relative to first support 94 and second support 110. First mass 130 includes a first end 132 provided with a first opening section 133, a second end 136 provided with a second opening section 137 and an intermediate portion 139 extending therebetween. A first tuning pin 142 extends through first opening 97, passes through first opening section 133 and into third opening 113. First tuning pin 142 allows first end 132 of first mass 130 to move along a pendulous path relative to first and second supports 94, 110. A second tuning pin 143 extends through second opening 101, passes through second opening section 137 and into fourth opening 117. Second tuning pin 143 allows second end 136 of first mass 130 to move along a pendulous path relative to first and second supports 94, 110. The movement of first mass 130 attenuates vibrations along first axis 89 an axis that is substantially perpendicular to main rotor axis "A" and substantially parallel with the plane in which rotor blades 60 rotate.

In still further accordance with an exemplary aspect, second bifilar vibration absorber 90 includes a support member 150. Support member 150 includes a first opening element 152 and a second opening element 153. Support member 150 is mounted to rotor hub 66 between first and second cantilevered ends 96 and 100 of first support 94 and third and fourth cantilevered ends 112 and 116 of second support 110. First opening element 152 is spaced from second opening element 153 along the second axis 91. In an example, first opening element 152 is spaced from second opening element 153 along first axis 89 that is substantially perpendicular to the plane in which rotor blades 60 rotate.

A second mass 160 is operatively connected with, and moveably mounted relative to, support member 150. Second mass 160, as seen in FIG. 3 and with continued reference to FIG. 2 is arranged radially inwardly of first mass 130 and, includes a first member 161 and a second member 162 joined by a bridge member 163. It is to be understood that the relative positions of first mass 130 and second mass 160 may vary. First member 161 includes a first end section 164 having a first opening portion 165 and a second end section 168 having a second opening portion 169. Second member 162 includes a third end section 176 having a third opening portion 180 that aligns with first opening portion 165 and a fourth end section 182 having a fourth opening portion 184 that aligns with second opening portion 169. First and third opening portions 165 and 180 also align with first opening element 152 of support member 150 while second and fourth opening portions 169 and 184 align with second opening element 153 of support member 150.

A first tuning pin member 190 extends through first opening portion 165, passes through first opening element 152 and passes into third opening portion 180. A second tuning pin member 191 extends through second opening portion 169 passes through second opening element 153 and into fourth opening portion 184. First and second tuning pin members 190 and 191 allow second mass 160 to move along a pendulous path relative to support member 150 to attenuate vibrations along second axis 91 that is substantially parallel to main rotor axis "A" and substantially perpendicular with the plane in which the rotor blades 60 rotate. As noted above, second bifilar vibration absorber 90 is co-located with first bifilar vibration absorber 88 with first mass 130 extending across and surrounding a portion of second mass 160.

It is to be understood that the exemplary embodiments describe a dual axis bifilar vibration absorber system having two collocated bifilar vibration absorbing components. Each bifilar vibration absorbing component attenuates vibrations along a distinct axis. In accordance with an exemplary aspect, the distinct axes are substantially perpendicular. The dual axis bifilar vibration absorber system is mounted to a rotor hub arranged between each pair of adjacent rotor blades. In this manner, each bifilar vibration absorbing component can be located in the plane of the blades on the side of the hub, which is a location where the component does not appreciably contribute to drag on the aircraft. However, it is understood that the component can be located in other locations on the hub in other aspects of the invention.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. By way of example, aspects of the invention can be used for fixed wing aircraft, wind and maritime turbines, maritime propulsion, industrial machinery, or other technologies where it is desirable to attenuate vibration. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A dual axis bifilar vibration absorber system comprising:
   a first bifilar vibration absorber including a first support having a first cantilevered end including a first opening and a second cantilevered end including a second opening, the first opening being spaced from the second opening along a first axis;
   a first mass operatively connected to the first support, the first mass including a first end having a first opening section, a second end including a second opening section, and an intermediate portion extending therebetween;
   a second bifilar vibration absorber collocated with the first bifilar vibration absorber, the second bifilar vibration absorber including a support member having a first opening element and a second opening element, the second opening element being spaced from the first opening element along a second axis that is substantially perpendicular to the first axis; and a second mass operatively connected to the support member, the second mass including a first end section having a first opening portion, and a second end section having a second opening portion, wherein the first mass is selectively pivotable about the second axis in order to attenuate vibration in the first axis, and the second mass is selectively pivotable about the first axis to attenuate vibration in the second axis.

2. The dual axis bifilar vibration absorber system according to claim 1, wherein the second bifilar vibration absorber is arranged between the first opening and the second opening.

3. The dual axis bifilar vibration absorber system according to claim 2, wherein the second mass is arranged radially inwardly of the first mass.

4. The dual axis bifilar vibration absorber system according to claim 1, wherein the first support includes a first mounting end connectable to a rotor hub and a second mounting end connectable to the rotor hub, the support member being connectable to the rotor hub between the first and second mounting ends.

5. The dual axis bifilar vibration absorber system according to claim 4, further comprising: a second support spaced from the first support along the second axis, the second support including a third cantilevered end including a third opening and a fourth cantilevered end including a fourth opening, the third opening being spaced from the fourth opening along the first axis, the first mass being arranged between the third cantilevered end and the fourth cantilevered end.

6. The dual axis bifilar vibration absorber system according to claim 5, further comprising: a first tuning pin extending from the first opening to the third opening through the first opening section, and a second tuning pin extending from the second opening to the fourth opening through the second opening section.

7. The dual axis bifilar vibration absorber system according to claim 1, wherein the second mass includes a first member having the first and second opening portions, and a second member having a third opening portion and a fourth opening portion, wherein the second opening portion is spaced from the first opening portion along the second axis and the fourth opening portion is spaced from the third opening portion along the second axis, the support member being arranged between the first and second members.

8. The dual axis bifilar vibration absorber system according to claim 7, further comprising: a first tuning pin member extending from the first opening portion to the third opening portion through the first opening element, and a second tuning pin member extending from the second opening portion to the fourth opening portion through the second opening element.

9. A rotary wing aircraft comprising:
a fuselage;
a prime mover supported by the fuselage;
a rotor assembly including a rotor hub and a plurality of rotor blades operatively connected to the prime mover; and
a dual axis bifilar vibration absorber system mounted to the rotor hub, the dual axis bifilar vibration absorber system comprising:
a first bifilar vibration absorber including a first support mounted to the rotor hub, the first support having a first cantilevered end including a first opening and a second cantilevered end including a second opening, the first opening being spaced from the second opening along a first axis;
a first mass operatively connected to the first support, the first mass includes a first end having a first opening section, a second end including a second opening section, and an intermediate portion extending therebetween;
a second bifilar vibration absorber collocated with the first bifilar vibration absorber, the second bifilar vibration absorber including a support member having a first opening element and a second opening element, the second opening element being spaced from the first opening element along a second axis that is substantially perpendicular to the first axis; and
a second mass operatively connected to the support member, the second mass including a first end section having a first opening portion and a second end section having a second opening portion, wherein the first mass is selectively pivotable about the second axis in order to attenuate vibration in the first axis, and the second mass is selectively pivotable about the first axis to attenuate vibration in the second axis.

10. The rotary wing aircraft according to claim 9, wherein the second bifilar vibration absorber is arranged between the first opening and the second opening.

11. The rotary wing aircraft according to claim 10, wherein the second mass is arranged radially inwardly of the first mass.

12. The rotary wing aircraft according to claim 9, wherein the second mass includes a first member having the first and second opening portions, and a second member having a third opening portion and a fourth opening portion, wherein the second opening portion is spaced from the first opening portion along the second axis and the fourth opening portion is spaced from the third opening portion along the second axis, the support member being arranged between the first and second members.

13. The rotary wing aircraft according to claim 12, further comprising: a first tuning pin member extending from the first opening portion to the third opening portion through the first opening element, and a second tuning pin member extending from the second opening portion to the fourth opening portion through the second opening element.

14. The rotary wing aircraft according to claim 9, wherein the rotor assembly comprises a main rotor assembly.

15. The rotary wing aircraft according to claim 9, wherein the first mass surrounds a portion of the second mass.

16. The rotary wing aircraft according to claim 9, wherein the dual axis bifilar vibration absorber system is mounted to the rotor hub between adjacent ones of two of the plurality of rotor blades.

17. The rotary wing aircraft according to claim 16, wherein the dual axis bifilar vibration absorber system is mounted to the rotor hub between adjacent ones of each of the plurality of rotor blades.

18. The rotary wing aircraft according to claim 16, wherein the dual axis bifilar vibration absorber system defines a low-profile vibration absorption system.

19. The rotary wing aircraft according to claim 18, wherein the low profile vibration absorption system is arranged substantially coplanar with the two of the plurality of rotor blades.

20. The rotary wing aircraft according to claim 16, wherein the low profile vibration absorption system is arranged so as to reduce extension past an upper surface of the rotor hub.

* * * * *